(12) United States Patent
Sugimoto et al.

(10) Patent No.: US 10,189,403 B2
(45) Date of Patent: Jan. 29, 2019

(54) VEHICLE INTERIOR ILLUMINATION DEVICE

(71) Applicant: YAZAKI CORPORATION, Tokyo (JP)

(72) Inventors: Terumitsu Sugimoto, Shizuoka (JP); Takao Ota, Shizuoka (JP); Tomonori Ohashi, Shizuoka (JP); Kazuya Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/722,424

(22) Filed: Oct. 2, 2017

(65) Prior Publication Data

US 2018/0099611 A1    Apr. 12, 2018

(30) Foreign Application Priority Data

Oct. 7, 2016 (JP) ................ 2016-198966

(51) Int. Cl.
| | |
|---|---|
| H05B 33/00 | (2006.01) |
| B60Q 3/80 | (2017.01) |
| B60Q 3/40 | (2017.01) |
| B60Q 3/74 | (2017.01) |
| G07B 13/04 | (2006.01) |
| G07B 15/00 | (2011.01) |

(52) U.S. Cl.
CPC ............. B60Q 3/80 (2017.02); B60Q 3/40 (2017.02); B60Q 3/74 (2017.02); G07B 13/04 (2013.01); G07B 15/00 (2013.01)

(58) Field of Classification Search
CPC ....... H01L 2924/00; H01L 2224/48091; H01L 2924/12044; H01L 2924/181; H01L 2924/3025; H01L 27/3239; H01L 2924/00012; H01L 2924/00014; H01L 33/60; H01L 2224/0401; H01L 2224/05082; H01L 2224/05147
See application file for complete search history.

(56) References Cited

U.S. PATENT DOCUMENTS

| | | | |
|---|---|---|---|
| 9,889,794 B2 * | 2/2018 | Wengelnik | ............ B60Q 3/745 |
| 2006/0279959 A1 | 12/2006 | Yabashi et al. | |
| 2017/0179269 A1 * | 6/2017 | Xiao | ..................... H01L 29/775 |

FOREIGN PATENT DOCUMENTS

| | | |
|---|---|---|
| JP | 2006-44567 A | 2/2006 |
| JP | 2012-101635 A | 5/2012 |

OTHER PUBLICATIONS

Japanese Office Action for the related Japanese Patent Application No. 2016-198966 dated Oct. 30, 2018.

* cited by examiner

*Primary Examiner* — Monica C King
(74) *Attorney, Agent, or Firm* — Kenealy Vaidya LLP

(57) ABSTRACT

A vehicle interior illumination device for controlling illumination in a vehicle interior includes an operation input portion configured to receive an instruction operation of either lighting or light adjustment by a user, a first state detection portion configured to detect a first state representative of a getting-off preparation of the user, a second state detection portion configured to detect a second state representative of a getting-off completion of the user, and a light adjustment degree setting portion configured to shift the illumination to a preset light adjustment degree including off when the first state and the second state are detected.

8 Claims, 6 Drawing Sheets

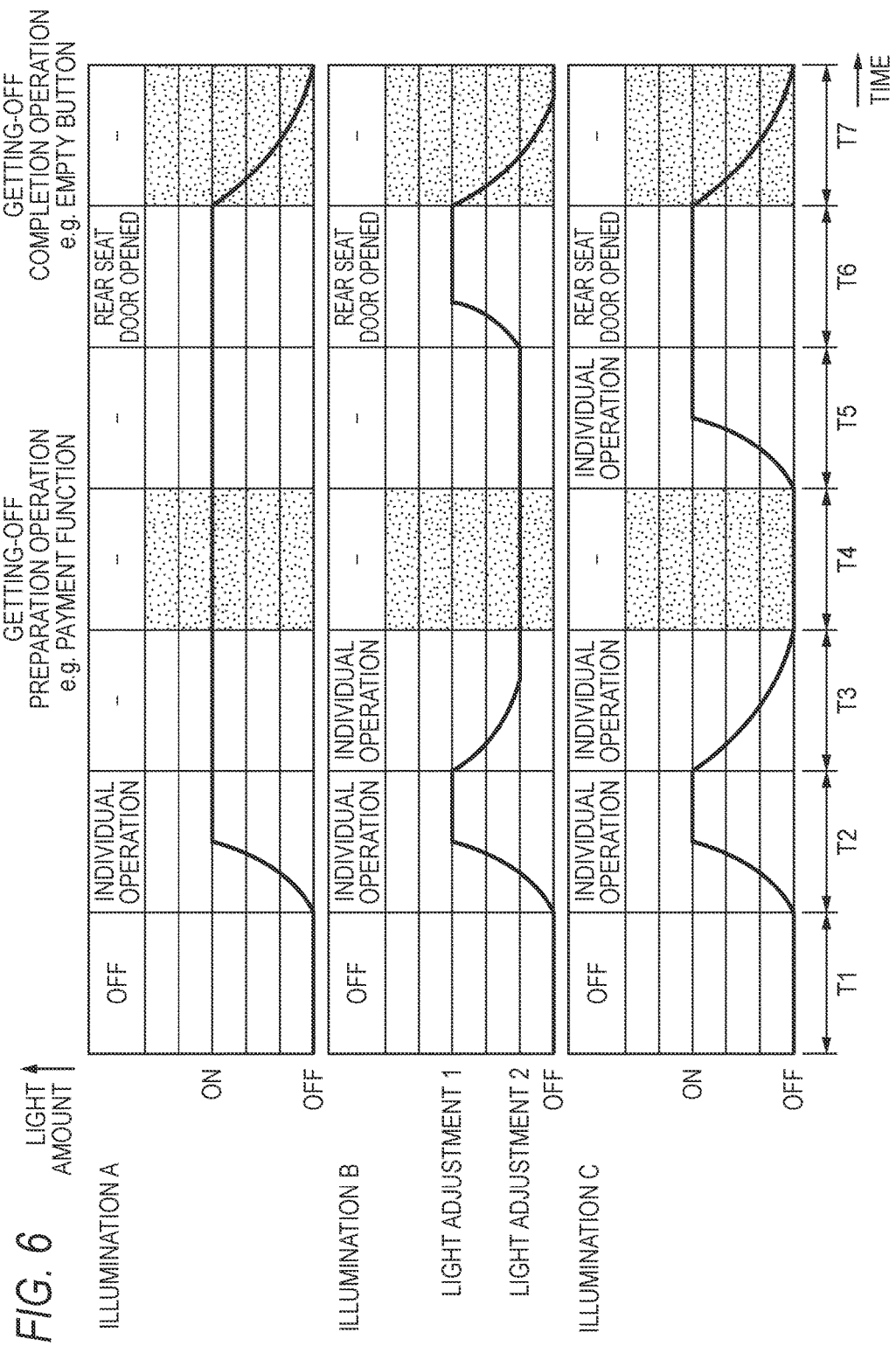

VEHICLE INTERIOR ILLUMINATION DEVICE

CROSS REFERENCE TO RELATED APPLICATIONS

This application is based on Japanese Patent Application (No. 2016-198966) filed on Oct. 7, 2016, the contents of which are incorporated herein by reference.

BACKGROUND OF THE INVENTION

1. Field of the Invention

The present invention relates to a vehicle interior illumination device mounted on a vehicle.

2. Description of the Related Art

Conventionally, personal lamps that can be used by passengers sitting on the rear seat are set on the roof, pillars and the like in the vehicle interior. The personal lamps are illuminating lamps that illuminate the rear seat, and are lit not only when a lighting switch operated by the passenger at the time of reading is turned on but also when a door switch detecting that a door on the rear seat side is opened or a seat belt switch detecting that a seat belt is not fastened is on. The illumination of the personal lamps is called functional illumination.

Moreover, as a prior art, it is known to dress the vehicle interior with illumination suitable for the mood and atmosphere of passengers and the like by emitting light with a variable light amount and hue when the entire vehicle interior is illuminated by a monitor attached to the ceiling of the vehicle interior (see JP-A-2006-44567). Such illumination is called atmospheric illumination.

In vehicles for a business moving operation such as taxis, it is also necessary to sufficiently consider the convenience of users sitting on the rear seat and the atmosphere by illumination. Therefore, it is assumed that a personal lamp that can be lit by a user operating a switch or the like is set in the neighborhood of the rear seat or that illumination equipment for creating the user's atmosphere is set in the neighborhood of the rear seat.

However, for example, if a user gets off while forgetting to switch off the personal lamp, the personal lamp in the neighborhood of the rear seat is maintained on even under a condition where no user is on the vehicle. Under such a condition, the personal lamp wastefully consumes the power. Moreover, when the next user gets on, there is a possibility that he/she feels uncomfortable if an unnecessary personal lamp is on.

Therefore, the operator of the taxi vehicle cannot help but perform a special work such as checking if the illumination of the rear seat is left on and operating the switch every time a user gets off. Moreover, since there are cases where the operator of the taxi vehicle forgets such a work, there is a possibility that the personal lamp continues wasteful power consumption or makes the next user uncomfortable.

SUMMARY OF THE INVENTION

The present invention is made in view of the above-mentioned circumferences, and an object thereof is to provide a vehicle interior illumination device capable of preventing an illuminating lamp for a rear seat from continuing to operate unnecessarily when no passenger such as a user is on the rear seat.

To attain the above-mentioned object, a vehicle interior illumination device according to the present invention is characterized by the following (1) to (4):

(1) A vehicle interior illumination device for controlling illumination in a vehicle interior, the vehicle interior illumination device comprising:
an operation input portion configured to receive an instruction operation of either lighting or light adjustment by a user;
a first state detection portion configured to detect a first state representative of a getting-off preparation of the user;
a second state detection portion configured to detect a second state representative of a getting-off completion of the user; and
a light adjustment degree setting portion configured to shift the illumination to a preset light adjustment degree including off when the first state and the second state are detected.

(2) The vehicle interior illumination device according to the above (1), wherein:
the vehicle interior illumination device is equipped for a use in a vehicle performing a business moving operation for the user, and is configured to cooperate with a fare calculation device that is set in the vehicle, calculates a fare corresponding to the business moving operation of the vehicle and displays the fare to the user,
the first state detection portion detects, as the first state, an operation executed on the fare calculation device when the vehicle arrives at a destination, and
the second state detection portion detects, as the second state, that a door of the vehicle is opened or closed after the detection of the first state.

(3) The vehicle interior illumination device according to the above (1), wherein:
the vehicle interior illumination device is equipped for a use in a vehicle performing a business moving operation for the user, and is configured to cooperate with a fare calculation device that is set in the vehicle, calculates a fare corresponding to the business moving operation of the vehicle and displays the fare to the user,
the first state detection portion detects, as the first state, a first operation executed on the fare calculation device when the vehicle arrives at a destination, and
the second state detection portion detects, as the second state, a second operation executed on the fare calculation device after the detection of the first state.

(4) The vehicle interior illumination device according to the above (1), wherein:
the vehicle interior illumination device is equipped for a use in a vehicle performing a business moving operation for the user, and is configured to cooperate with a fare calculation device that is set in the vehicle, calculates a fare corresponding to the business moving operation and displays the fare to the user,
the first state detection portion detects, as the first state, an operation executed on the fare calculation device when the vehicle arrives at a destination or detects, as the first state, that a door of the vehicle is opened or closed, and
the second state detection portion detects, as the second state, that a predetermined time has been elapsed from the detection of the first state.

According to the vehicle interior illumination device of the structure of the above (1), the turning-off control and light adjustment control of the illumination in the vehicle interior can be automatically performed based on the detection of both the getting-off preparation and getting-off completion of the user. Consequently, after the user actually gets off, the illuminating lamp at the rear seat or the like can be prevented from unnecessarily operating.

According to the vehicle interior illumination device of the structure of the above (2), since cooperation with the fare calculation device such as a taximeter is possible, the state of getting-off preparation of the user can be more reliably detected. Moreover, since the state of getting-off completion is detected based on opening or closing of a door, the light amount of the illuminating lamp at the rear seat or the like can be changed immediately after the completion of getting-off of the user.

According to the vehicle interior illumination device of the structure of the above (3), since cooperation with the fare calculation device such as a taximeter is possible, for example, the state of getting-off preparation of the user can be reliably detected according to a case such as when a "payment" button is depressed. Moreover, the state of getting-off completion can also be detected reliably according to a case such as when an "empty" button is depressed, and the light amount of the illuminating lamp at the rear seat or the like can be changed immediately after the completion of getting-off of the user.

According to the vehicle interior illumination device of the structure of the above (4), by cooperating with the fare calculation device or by detecting the opened/closed state of a door, the state of getting-off preparation of the user can be reliably detected. Moreover, since the state of getting-off completion is detected when a predetermined time has elapsed from the detection of the getting-off preparation, the illuminating lamp at the rear seat or the like can be reliably prevented from continuing to unnecessarily operate after the completion of getting-off of the user.

According to the vehicle interior illumination device of the present invention, the illuminating lamp for the rear seat can be prevented from continuing to unnecessarily operate when no passenger such as a user is present on the rear seat or the like. Further, since it is unnecessary for the operator such as the driver to perform a special confirmation work or the like other than conventional normal operations, the operation efficiency is improved.

The present invention has been briefly described above. Further, details of the present invention will be further clarified by reading through the mode for carrying out the invention (hereinafter, referred to as "embodiment") described below with reference to the attached drawings.

BRIEF DESCRIPTION OF THE DRAWINGS

FIG. 6 is a time chart showing a light adjustment operation example of the vehicle interior illumination device.

DETAILED DESCRIPTION OF THE EXEMPLARY EMBODIMENTS

A concrete embodiment related to the present invention will be described below with reference to the drawings.

First, a concrete example of a vehicle mounted with a vehicle interior illumination device will be described.

Figure 1:
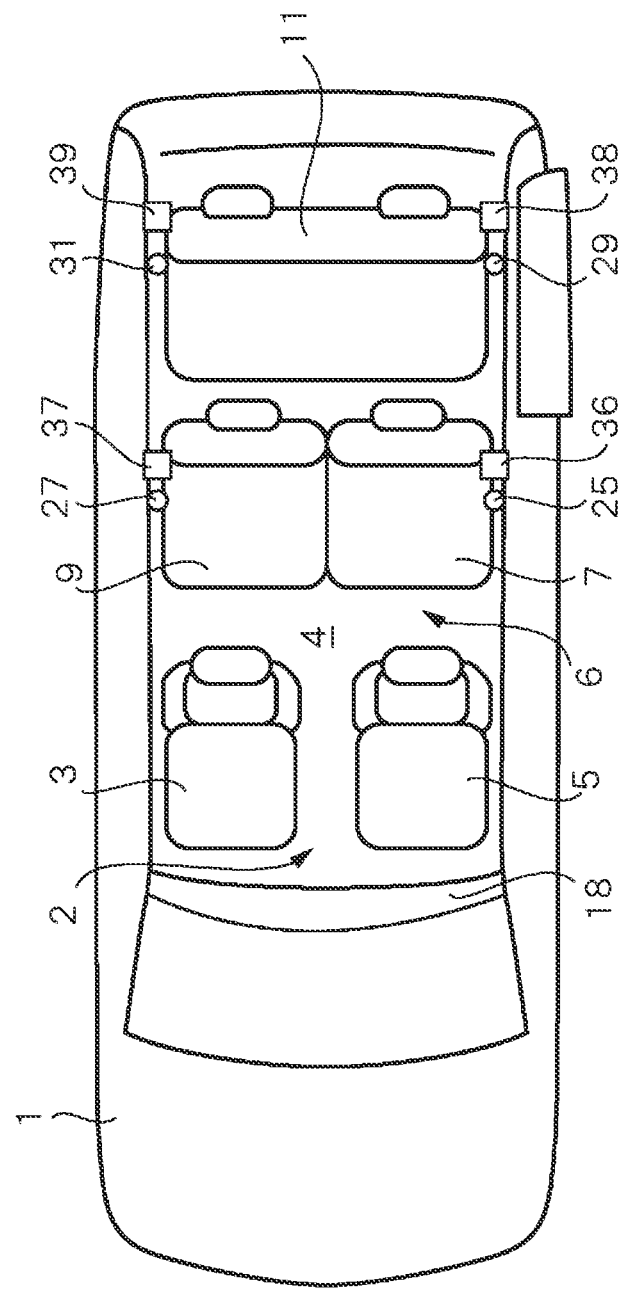
FIG. 1 is a plan view showing an example of the structure in the vehicle interior of a vehicle mounted with a vehicle interior illumination device.
Figure 2:
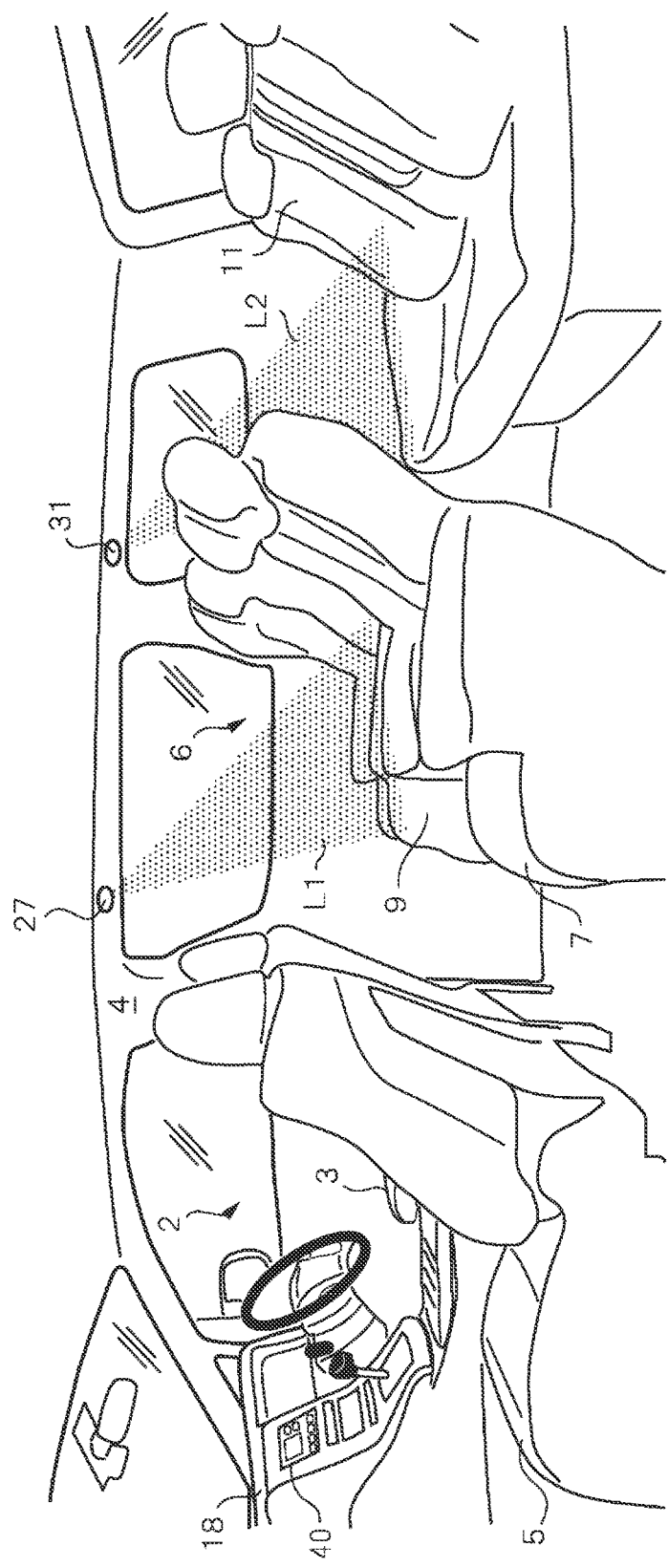
FIG. 2 is a side view showing a condition where the vehicle interior of the vehicle mounted with the vehicle interior illumination device is viewed from a left side.

A concrete example of a condition where the inside of a vehicle interior 4 of a vehicle 1 mounted with a vehicle interior illumination device 10 is viewed from above is shown in FIG. 1. Moreover, a concrete example of the vehicle interior 4 where the vehicle 1 is viewed from the left side is shown in FIG. 2. While a vehicle that performs a business moving operation with a user on the rear seat and the like like a taxi is assumed as a vehicle mounted with the vehicle interior illumination device of the present invention, there is no specific limitation to the vehicle kind. Here, when business is performed as a taxi, it is necessary to mount a predetermined taximeter 40 on the vehicle 1 so that an adequate fare can be presented to the user.

The vehicle 1 shown in FIGS. 1 and 2 is a seven-seat minivan where seats are provided in three rows. The vehicle interior 4 is broadly divided into a front interior 2 on the side of a driver seat 3 and a rear interior 6 on the side of passengers (users or the like).

On the trim covers in upper parts of the sides of central seats 7 and 9 of the rear interior 6, personal lamps 25 and 27 and personal switches (SWs) 36 and 37 are disposed, respectively. Likewise, on the trim covers in upper parts of both sides of a rear seat 11 of the rear interior 6, personal lamps 29 and 31 and personal SWs 38 and 39 are disposed, respectively.

The personal SWs 36, 37, 38 and 39 are switches that can be individually operated by passengers (users or the like) setting on the seats, and are capable of operations for switching between on and off and light amount adjustment. For example, when a user on the rear seat 11 reads a book at night, the personal lamps 25, 27, 29 and 31 can be used as functional illumination for reading by operating any of the personal SWs 36, 37, 38 and 39 to switch the personal lamp 25, 27, 29 or 31 to an on state with a light amount of 100%. Moreover, the personal lamps 25, 27, 29 and 31 can be used as atmospheric illumination, for example, by an adjustment to a light amount of approximately 20%.

In addition of the individual operation using the personal SWs 36, 37, 38 and 39, as an operation interlocked with the vehicle 1, the personal lamps 25, 27, 29 and 31 may be automatically lit, for example, when the door of each seat is opened or when a passenger does not fasten the seat belt.

In any of the cases of the functional illumination and the atmospheric illumination, as shown in FIG. 2, the personal lamps 27 and 31 emit illumination light beams L1 and L2 toward the rear of the vehicle interior 4 to the central seat 9 and the rear seat 11, respectively. The same applies to the personal lamps 25 and 29.

Next, the structure of an electric circuit in the vehicle interior illumination device will be described.

Figure 3:
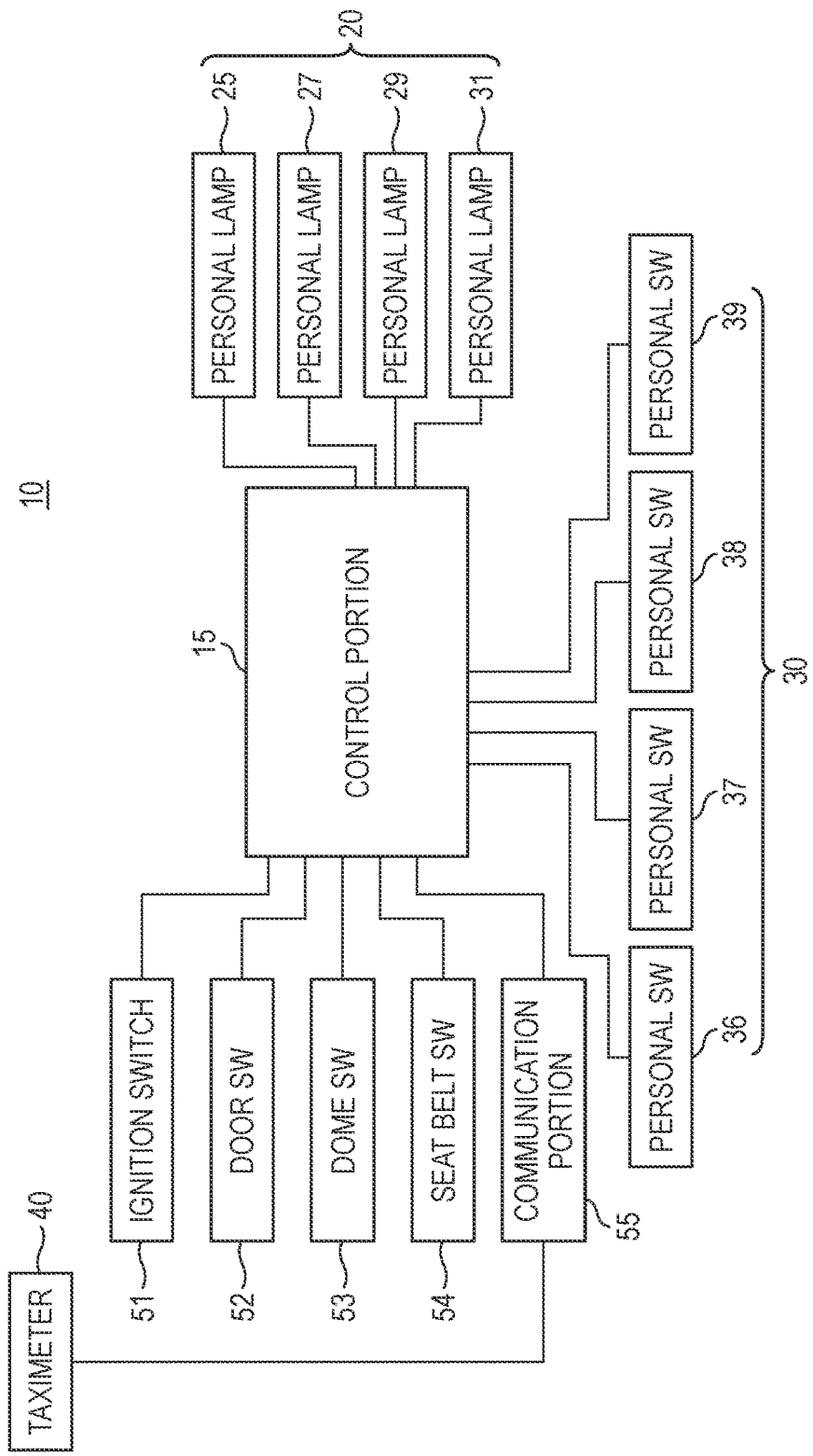
FIG. 3 is a block diagram showing a structure example of an electric circuit of the vehicle interior illumination device.

A structure example of the electric circuit of the vehicle interior illumination device 10 is shown in FIG. 3. This vehicle interior illumination device 10 is mainly formed of a control portion 15 structured as an ECU (electric control unit). This control portion 15 incorporates a known CPU, ROM and the like, and integratedly controls components of the vehicle interior illumination device 10 by the CPU executing an operation program stored in the ROM.

To the control portion 15 shown in FIG. 3, an ignition (IG) switch 51, a door SW 52, a dome SW 53, a seat belt SW 54 and personal SWs 36 to 39 are connected as switches providing instructions.

The IG switch 51 is operated by the driver, and by the IG switch 51 being turned on, the vehicle is brought into driving state. The door SW 52 (detection portion) detects the opened/closed state of each door, and detects a door locking operation or a door unlocking operation of each door.

The dome SW 53 is a switch capable of turning on doomed illumination that is set on the ceiling of the vehicle interior 4. The seat belt SW 54 is provided for each seat, and detects whether the seat belt is fastened or not. The personal SWs 36 to 39 are switches capable of turning on the personal lamps 25, 27, 29 and 31 or controlling light thereof by the passenger sitting on each seat, and output the on/off state thereof to the control portion 15. When it is not specifically necessary to distinguish among the personal SWs 36 to 39, they will be generally referred to as personal SW 30.

Moreover, to the control portion 15, the personal lamps 25, 27, 29 and 31 are connected as devices to be controlled. Further, to enable an operation linked with the taximeter 40 mounted on the vehicle 1 which is a taxi, the control portion 15 is connected to the taximeter 40 through a communication portion 55.

The personal lamps 25, 27, 29 and 31 illuminate the central seat 7 on the left side, the central seat 9 on the right side, the rear seat 11 on the left side and the rear seat 11 on the right side, respectively. In particular, when it is not necessary to distinguish among the personal lamps, they will be generally referred to as personal lamp 20. The personal lamp 20 is driven by the control portion 15 performing PWM (pulse width modulation) control of energization, and is variably lit within a range of 0% to 100% in the duty ratio of the pulse, that is, in a range of 0% to 100% in light amount.

Moreover, the personal lamp 20 can be lit with a desired light amount as functional illumination or atmospheric illumination by an individual operation of the personal SW 30 by the passenger sitting on each seat. Moreover, as an operation interlocked with the vehicle 1, the personal lamp 20 can be lit with high illuminance (light amount 100%) in cases such as when the passenger setting on each seat opens the door, when the door unlocking operation is performed, when a passenger does not fasten the seat belt and when the doomed illumination is on.

Next, a brief description of the taxi meter will be given.

The taximeter 40 is provided with an operation portion having a multiplicity of buttons operable by the operator on the driver seat 3 and a display portion that displays information such as the fare so that the operator and the user and the like in the rear interior 6 can visually recognize it. Like typical taxi meters, the operation portion of the taximeter 40 is provided with a plurality of buttons assigned with functions such as "empty", "occupied", "payment" and "total".

The "empty" button is depressed in order to reset the fare calculation and indicate to the exterior that the taxi is in the empty state where no user is currently in the taxi and a new user can be picked up to perform a business moving operation. The "occupied" button is depressed when a new user gets on to start a business moving operation, whereby the calculation of the fare is started. The "payment" button is depressed to determine the fare paid by the user when the taxi arrives at the destination.

Therefore, for example, when the "payment" button of the taximeter 40 is depressed, it can be assumed that the current user is in preparation for getting off. Moreover, when the "empty" button is depressed after the "payment" button is depressed, it is assumed that the getting off of the user who had been on the taxi until just therebefore is completed. Needless to say, the state where the user is in preparation for getting off or the state where the getting off of the user is completed can be detected by grasping an operation of a button other than the "payment" and the "empty" button and the states of similar functions.

Next, a concrete example of automatic light adjustment control will be described.

<Automatic Light Adjustment Control (1)>

Figure 4:
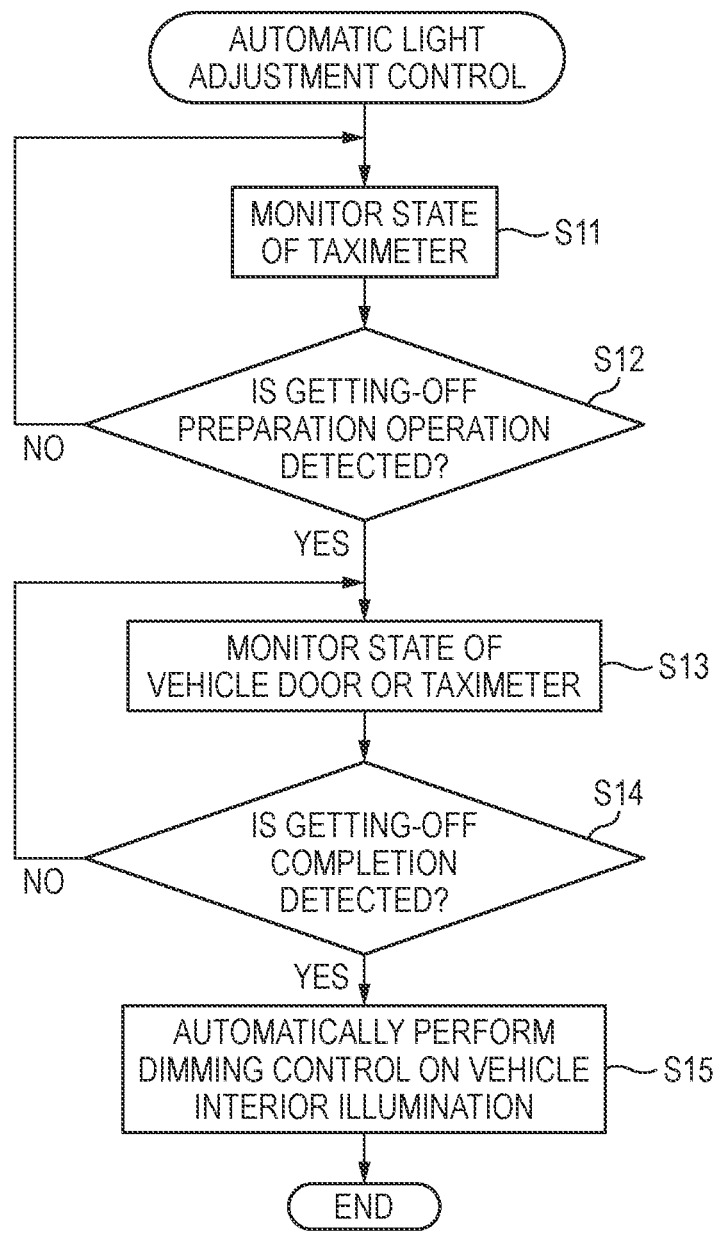
FIG. 4 is a flowchart showing a first example of an automatic light adjustment control of the vehicle interior illumination device in the embodiment of the present invention.

A first example of an automatic light adjustment control of the vehicle interior illumination device 10 in the embodiment of the present invention is shown in FIG. 4. That is, by the CPU in the control portion 15 shown in FIG. 3 executing the control shown in FIG. 4, the function for preventing the interior illumination in the rear interior 6 from being forgotten to be turned off when the user gets off is implemented. The control shown in FIG. 4 is executed when the vehicle 1 which is a taxi is in service. Whether the taxi is in service or not can be identified by the state of the taximeter 40.

In the control shown in FIG. 4, the control portion 15 performs communication with the taximeter 40 through the communication portion 55 at step S11 to monitor the state of the taximeter 40. Then, the control portion 15 determines whether a predetermined "getting-off preparation operation" is detected or not at step S12.

As a concrete example, the detection of depression of the "payment" button on the taximeter 40 is detected as the user's "getting-off preparation operation". Needless to say, it is considered to monitor an operation of a button other than the "payment" button, and the states of various functions implemented by various in-vehicle devices may be associated with the user's "getting-off preparation operation". That is, the "getting-off preparation operation" is detected by monitoring a switch or a function used only when the user gets off.

When the "getting-off preparation operation" is detected, the control portion 15 monitors the state of the door SW 52 or the taximeter 40 at step S13, and detects the presence or absence of a predetermined "getting-off completion operation" at step S14.

As a concrete example, when it is detected that a rear door of the vehicle 1 is changed from "opened" to "closed" based on the signal of the door SW 52, the control portion 15 determines that the "getting-off completion operation" is present, and proceeds to step S15. Alternatively, when the depression of the "empty" button of the taximeter 40 is detected, the control portion 15 determines that the "getting-off completion operation" is present, and proceeds to the next step S15. It is also considered to monitor an operation of a button other than the "empty" button and the state of a function. That is, the "getting-off completion operation" is detected by monitoring a switch or a function used only when the user gets off.

When the above-described "getting-off preparation operation" is detected and the above-described "getting-off completion operation" is further detected, the control portion 15 automatically performs dimming control on the personal lamp 20 which is vehicle interior illumination at the next step S15. For example, switching is made from the state where the personal lamp 20 is lit with a light amount of 100% to the state where it is completely off. Alternatively, switching is made from the state where the personal lamp 20 is lit, for example, with a light amount of 80% to the state where it is lit with a light amount of 20%.

By performing such dimming control, the wasteful power consumption by the personal lamp 20 that is not actually used can be suppressed. Moreover, the next user can be prevented from feeling uncomfortable to see the personal lamp 20 being lit with an unnecessarily high brightness when he/she gets on.

<Automatic Light Adjustment Control (2)>

Figure 5:
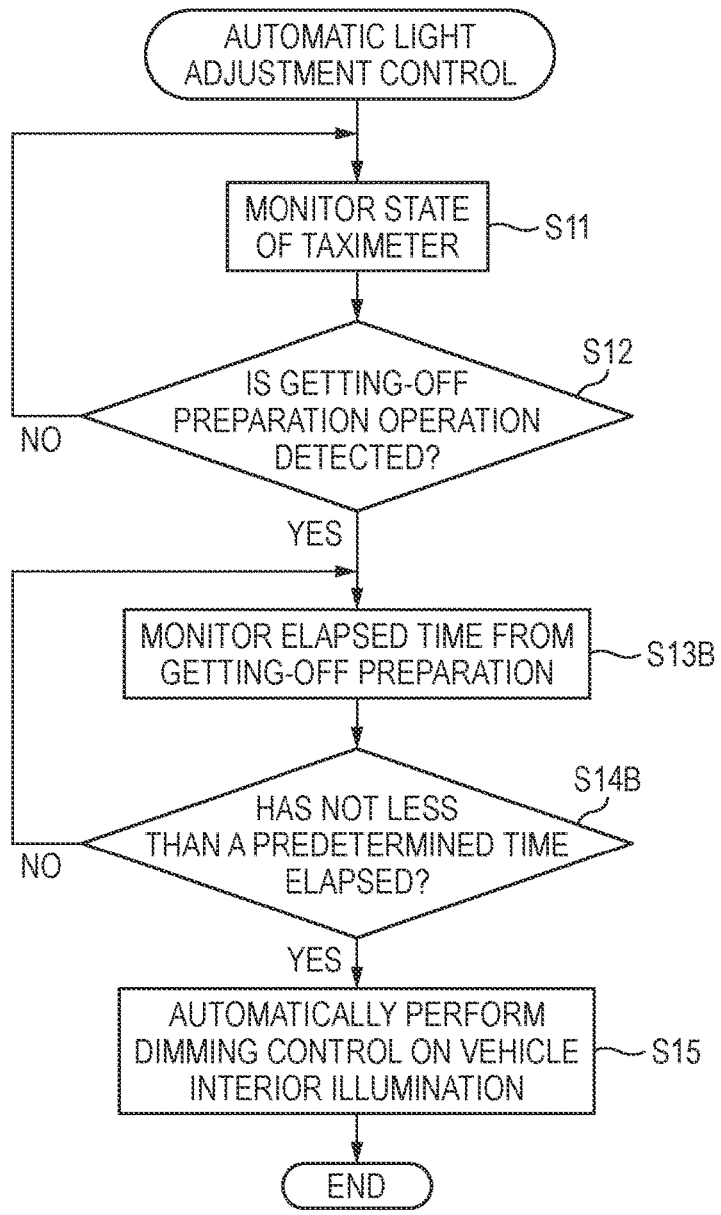
FIG. 5 is a flowchart showing a second example of an automatic light adjustment control of the vehicle interior illumination device in the embodiment of the present invention.

A second example of an automatic light adjustment control of the vehicle interior illumination device 10 in the embodiment of the present invention is shown in FIG. 5. That is, by the CPU in the control portion 15 shown in FIG. 3 executing the control shown in FIG. 5, the function for preventing the interior illumination in the rear interior 6 from being forgotten to be turned off when the user gets off is implemented. The control shown in FIG. 5 is executed when the vehicle 1 which is a taxi is in service. Whether the taxi is in service or not can be identified by the state of the taximeter 40.

At steps S11 and S12 shown in FIG. 5, the same processing as that of step S11 and S12 shown in FIG. 4 is executed. That is, the control portion 15 monitors the state of the taximeter 40, and determines whether the "getting-off preparation operation" is detected or not.

When the "getting-off preparation operation" is detected, the control portion 15 monitors the time elapsed from the detection of the "getting-off preparation operation" at step S13B. Then, when the length of the elapsed time becomes not less than a predetermined time, the control portion 15 determines that the "getting-off completion operation" is present at step S14B, and proceeds to step S15.

As a concrete example of the predetermined time, for example, approximately 60 seconds may be assumed. That is, since it can be imagined that the getting-off of the user has already been completed if a time of approximately 60 seconds has elapsed from the detection of the "getting-off preparation operation", the illumination light of the personal lamp 20 is unnecessary at that time, and dimming is desirable.

When the "getting-off preparation operation" is detected and the "getting-off completion" is further detected at step S14B, the control portion 15 automatically performs dimming control on the personal lamp 20 which is vehicle interior illumination at step S15 like the control shown in FIG. 4.

By performing such dimming control, the wasteful power consumption by the personal lamp 20 that is not actually used can be suppressed. Moreover, the next user can be prevented from feeling uncomfortable to see the personal lamp 20 being lit with an unnecessarily high brightness when he/she gets on.

<Others>

While in the control shown in FIG. 5, the "getting-off preparation operation" is detected by monitoring the state of the taximeter 40, the "getting-off preparation operation" may also be detected by monitoring the opened/closed state of the door by using the door SW 52 as at step S13 of FIG. 4. That is, it is also considered to make a change so that the processing of monitoring the door SW 52 is executed instead of step S11 of FIG. 5 and the processing of detecting the change from "closed" to "opened" of the door as the "getting-off preparation operation" is executed instead of step S12 of FIG. 5.

Next, an example of the operation of the vehicle interior illumination device will be described.

An example of the light adjustment operation of the vehicle interior illumination device 10 is shown in FIG. 6. In the example shown in FIG. 6, a case is assumed where the vehicle interior illumination device 10 simultaneously controls the three of "illumination A", "illumination B" and "illumination C". Here, the "illumination A", the "illumination B" and the "illumination C" correspond to the personal lamps 25, 27, 29 and the like.

In the time period of a section T1 shown in FIG. 6, the "illumination A", the "illumination B" and the "illumination C" are all off (light amount 0%: off). This state corresponds to a case where no user is on the vehicle 1 which is a taxi (empty state), a situation immediately after a user gets on, or the like.

In the time period of a section T2 shown in FIG. 6, a situation is shown where the operation of the personal SW 30 is individually performed by the user for each of the "illumination A", the "illumination B" and the "illumination C" and the adjustment of the light amount is executed by the control portion 15 in accordance with the instruction by the individual operation. In the example shown in FIG. 6, the "illumination A" and the "illumination C" have the light amounts thereof smoothly switched from off (0%) to on (100%) in the section T2, and are maintained at a constant light amount thereafter. Moreover, the "illumination B" has the light amount thereof smoothly switched from off (0%) to a first light amount (for example, 75%) in the section T2, and is maintained at a constant light amount thereafter.

In the time period of a section T3 shown in FIG. 6, a situation is shown where the operation of the personal SW 30 is individually performed by the user for each of the "illumination B" and the "illumination C" and the adjustment of the light amount is executed by the control portion 15 in accordance with the instruction by the individual operation. In the example shown in FIG. 6, the "illumination B" has the light amounts thereof smoothly switched from the first light amount (for example, 75%) to a second light amount (for example, 20%) in the section T3, and is maintained at a constant light amount thereafter. Moreover, the "illumination C" has the light amount thereof smoothly switched from on (100%) to off (0%) in the section T3, and is maintained at the off state thereafter.

The time period of a section T4 shown in FIG. 6 is assumed to be a state where the vehicle 1 arrives at the destination and the user riding on the vehicle is performing fare payment and the like, that is, a state where the user is performing the "getting-off preparation operation". In the example shown in FIG. 6, since a case where the user does not turn off the personal lamp 20 is assumed, in the time period of the section T4, the "illumination C" is in the on state, whereas the "illumination A" is maintained in the on state with a light amount of 100% and the "illumination B" is maintained in the on state with the second light amount.

In the time period of a section T5 shown in FIG. 6, a situation is assumed where an individual operation is performed by an operation of the personal SW 30 by the user before getting off. In accordance with the instruction by this individual operation, the control portion 15 smoothly switches the light amount of the "illumination C2 from the off state to the on state.

In the time period of a section T6 shown in FIG. 6, a situation is shown where a rear seat door is changed from "closed" to "opened" in order to enable the user of the vehicle 1 to get off. Although not shown in the controls of FIGS. 4 and 5, when the rear seat door is changed from "closed" to "opened", the control portion 15 automatically lights the personal lamp 20 in order to facilitate the getting-off of the user. Therefore, in the time period of the section T6 shown in FIG. 6, the light amount of the "illumination B" is smoothly changed from the state where it is on with the comparatively dark second light amount (for example, 20%) to the state where it is on with the first light amount (for example, 75%). Here, since the "illumination A" and the "illumination C" are already in the on state, no special control is executed on these in the section T6.

In the time period of a section T7 shown in FIG. 6, a situation is shown where the getting-off of the user riding on the vehicle 1 is completed. For example, when the getting-off of the user is completed and the rear seat door is changed from "opened" to "closed", the operator (driver) of the vehicle 1 recognizes the completion of getting-off of the user, and executes the operation at the time of completion of getting-off on the taximeter 40. Specifically, the operator depresses the "empty" button. At this time, since the control portion 15 detects, for example, the getting-off completion operation at step S14 shown in FIG. 4, it executes the illumination dimming control at the next step S15.

As a result of the dimming control at step S15, in the time period of a section T7 shown in FIG. 6, the light amount is smoothly changed from the on state or a high light amount state to the off state for any of the "illumination A", the "illumination B" and the "illumination C2.

That is, by the control portion 15 executing the "automatic light adjustment control" shown in either of FIGS. 4 and 5, when the user completes the getting-off from the vehicle 1, the light amount of the vehicle interior illumination is automatically reduced as in the time period of the section T7 shown in FIG. 6. Therefore, when the user forgets to operate the personal SW 30 and gets off with the personal lamp 20 being on, even if the driver does not perform a special work such as a confirmation or a switch operation, the wasteful power consumption by the personal lamp 20 can be suppressed, and the next user can be prevented from feeling uncomfortable when getting on.

While in the above-described embodiment, a case is assumed where the control portion 15 in the vehicle interior illumination device 10 executes the "automatic light adjustment control" shown in FIG. 4 or 5 in cooperation with the taximeter 40, the present invention is not limited thereto, and the following modification may be made: For example, it is considered that the control portion in the taximeter 40 executes the same processing as steps S11 to S14 of FIG. 4 and when the "getting-off completion" is detected, a vehicle interior illumination dimming instruction is provided from the taximeter 40 to the vehicle interior illumination device 10. Moreover, the taximeter 40 and the vehicle interior illumination device 10 may be integrated with each other.

Moreover, it is considered to apply the present invention to vehicles other than vehicles performing a business moving operation like taxi vehicles. For example, the following may be performed: When the vehicle arrives at the destination, an operation of the unlocking button of the vehicle by the driver or the activation of the parking brake is detected as a first state representative of the user's getting-off preparation, and the "opened" or "closed" of the door is detected as a second state representative of the completion of getting-off of the user.

Now, features of the above-described embodiment of the vehicular interior illumination device according to the present invention is briefly summarized and listed in the following [1] to [4]:

[1] A vehicle interior illumination device (10) for controlling illumination in a vehicle interior, the vehicle interior illumination device (10) comprising:

an operation input portion configured to receive an instruction operation of either lighting or light adjustment by a user (the personal switch 30);

a first state detection portion configured to detect a first state representative of a getting-off preparation of the user (step S12 of the control portion 15);

a second state detection portion configured to detect a second state representative of a getting-off completion of the user (step S14 of the control portion 15); and a light adjustment degree setting portion configured to shift the illumination to a preset light adjustment degree including off when the first state and the second state are detected (step S15 of the control portion).

[2] The vehicle interior illumination device according to the above [1], wherein:

the vehicle interior illumination device is equipped for a use in a vehicle performing a business moving operation for the user, and is configured to cooperate with a fare calculation device (the taximeter 40) that is set in the vehicle, calculates a fare corresponding to the business moving operation of the vehicle and displays the fare to the user, the first state detection portion detects, as the first state, an operation executed on the fare calculation device when the vehicle arrives at a destination (step S12), and the second state detection portion detects, as the second state, that a door of the vehicle is opened or closed after the detection of the first state (step S14).

[3] The vehicle interior illumination device according to the above [1], wherein:

the vehicle interior illumination device is equipped for a use in a vehicle performing a business moving operation for the user, and is configured to cooperate with a fare calculation device (the taximeter 40) that is set in the vehicle, calculates a fare corresponding to the business moving operation of the vehicle and displays the fare to the user, the first state detection portion detects, as the first state, a first operation executed on the fare calculation device when the vehicle arrives at a destination (step S12), and the second state detection portion detects, as the second state, a second operation executed on the fare calculation device after the detection of the first state (step S14).

[4] The vehicle interior illumination device according to [1], wherein:

the vehicle interior illumination device is equipped for a use in a vehicle performing a business moving operation for the user, and is configured to cooperate with a fare calculation device (the taximeter 40) that is set in the vehicle, calculates a fare corresponding to the business moving operation and displays the fare to the user, the first state detection portion detects, as the first state, an operation executed on the fare calculation device when the vehicle arrives at a destination or detects as the first state, that a door of the vehicle is opened or closed (step S12), and the second state detection portion detects, as the second state, that a predetermined time has been elapsed from the detection of the first state (step S14B).

What is claimed is:

1. A vehicle interior illumination device for controlling illumination in a vehicle interior, the vehicle interior illumination device comprising:

an operation input portion configured to receive an instruction operation of either lighting or light adjustment by a user;

a first state detection portion configured to detect a first state representative of a getting-off preparation of the user;

a second state detection portion configured to detect a second state representative of a getting-off completion of the user; and a light adjustment degree setting portion configured to shift the illumination to a preset light adjustment degree including off when the first state and the second state are detected, wherein the second state is detected by the second state detection portion monitoring and detecting operation of the at least one of a switch and a function that is different from the operation input portion and either lighting or light adjustment.

2. The vehicle interior illumination device according to claim 1, wherein:

the vehicle interior illumination device is equipped for a use in a vehicle performing a business moving operation for the user, and is configured to cooperate with a fare calculation device that is set in the vehicle, calculates a fare corresponding to the business moving operation of the vehicle and displays the fare to the user, the first state detection portion detects, as the first state, an operation executed on the fare calculation device when the vehicle arrives at a destination, and the second state detection portion detects, as the second state, that a door of the vehicle is opened or closed after the detection of the first state.

3. The vehicle interior illumination device according to claim 1, wherein:

the vehicle interior illumination device is equipped for a use in a vehicle performing a business moving operation for the user, and is configured to cooperate with a fare calculation device that is set in the vehicle, calculates a fare corresponding to the business moving operation of the vehicle and displays the fare to the user, the first state detection portion detects, as the first state, a first operation executed on the fare calculation device when the vehicle arrives at a destination, and the second state detection portion detects, as the second state, a second operation executed on the fare calculation device after the detection of the first state.

4. The vehicle interior illumination device according to claim 1, wherein:

the vehicle interior illumination device is equipped for a use in a vehicle performing a business moving operation for the user, and is configured to cooperate with a fare calculation device that is set in the vehicle, calculates a fare corresponding to the business moving operation and displays the fare to the user, the first state detection portion detects, as the first state, an operation executed on the fare calculation device when the vehicle arrives at a destination or detects, as the first state, that a door of the vehicle is opened or closed, and the second state detection portion detects, as the second state, that a predetermined time has been elapsed from the detection of the first state.

5. The vehicle interior illumination device of claim 1, wherein operation of the at least one of the switch and the function is an operation executed on a fare calculation device after the vehicle arrives at a destination.

6. The vehicle interior illumination device of claim 1, wherein operation of the at least one of the switch and the function is an operation of opening or closing a door of the vehicle.

7. The vehicle interior illumination device of claim 1, wherein operation of the at least one of the switch and the function is an elapse of a predetermined amount of time.

8. The vehicle interior illumination device of claim 1, wherein operation of the at least one of the switch and the function is used only when the user gets off the vehicle.

* * * * *